United States Patent Office 3,122,557
Patented Feb. 25, 1964

3,122,557
NEW COUMARIN- AND α-PYRONE-3-
CARBOXAMIDES
Darius Molho, Gagny, France, assignor to "Lipha" Lyonnaise Industrielle Pharmaceutique S.A., Lyon, France
No Drawing. Filed Sept. 17, 1959, Ser. No. 840,505
Claims priority, application France Oct. 1, 1958
4 Claims. (Cl. 260—295)

The synthesis of certain amides of the pyran or benzopyran series has already been effected. Thus, 4-hydroxy - 5:6 - benzo-2-alpha-pyrone-3-N-phenylcarboxamide or 4-hydroxy-coumarin-3-N-phenylcarboxamide has been prepared by condensation of an ester of 4-hydroxycoumarin-3-carboxylic acid with aniline (Anschütz Ann. 367, 190 (1909)). However, this series had not heretofore been studied to any considerable extent and it was not thought that its compounds could be of any particular interest.

The present invention relates to a group of compounds of this series conforming to the general formula:

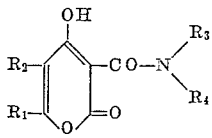

in which $R_1$ is an alkyl or aryl group or the first link of a benzene nucleus attached in the 5:6-position to the pyran nucleus, and optionally substituted by at least one halogen, hydroxy or nitro radical. $R_2$ is hydrogen or the last link of the above benzene nucleus.

$R_3$ is hydrogen, an alkyl or alkenyl group containing at most 12 carbon atoms, an aryl group substituted by at least one halogen, hydroxy, acyl or nitro radical, an optionally substituted pyridine group, or the first link attached to the adjacent nitrogen atom of a saturated heterocyclic nucleus containing this nitrogen atom.

$R_4$ is hydrogen or the second link attached to the nitrogen atom of the aforesaid saturated heterocyclic nucleus.

These compounds have exhibited inhibiting properties on bacterial and microscopic fungi. By reason of these properties they can be used inter alia as active constituents of antiseptic products or of products employed to combat moulds. Moreover, by reason of their antibacterial or fungicidal activity, they may be employed in human or veterinary therapy.

The above-defined compounds can be prepared by various processes, which also form part of the invention.

The first process, which is absolutely generally applicable, consists in heating together an alkyl ester of the general formula:

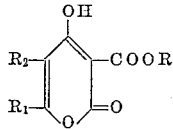

and the amine of the general formula

It is similar to the process already employed in the preparation of 4-hydroxy-coumarin-3-N-phenylcarboxamide, which is a known compound already mentioned in the foregoing. The reaction takes place without catalyst at about 160° to 180° C., and takes from one-half to 4 hours in a sealed or open tube, depending upon whether the amine is more or less volatile.

On the other hand, the following processes of preparation are absolutely novel, but they are applicable only when the group $R_4$ of the general formula is hydrogen.

The second process consists in heating together 4-hydroxy-2-alpha-pyrone of the general formula

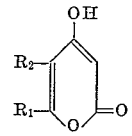

in which $R_1$ and $R_2$ have the same meaning as before, with isocyanate or azide of the general formula

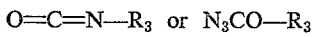

respectively. The reaction also takes place without catalyst at about 160° to 180° C. in a period of from 15 minutes to 4 hours.

The third process consists in heating together 4-hydroxy-2-alpha-pyrone of the above general formula with isothiocyanate of the general formula $S=C=N—R_3$, so as to obtain 4-hydroxy-2-alpha-pyrone-3-N-substituted-thiocarboxamide, which is treated with basic lead acetate. The condensation reaction of 4-hydroxy-2-alpha-3-pyrone and of isothiocyanate takes place under substantially the same conditions as that of the isocyanate, that is to say, without catalyst, and from 160° to 180° C., in from 15 minutes to 4 hours. The 4-hydroxy-2-alpha-pyrone-3-N-substituted-thiocarboxamides intermediately formed are themselves novel products, and thus form part of the invention.

Some of the compounds of the invention exhibit high inhibiting activity on Gram-positive bacteria. This is true more especially of derivatives substituted on the nitrogen by long aliphatic chains containing from 6 to 12 carbon atoms, the maximum activity corresponding to chains containing 6, 7 or 8 carbon atoms. For example, 4 - hydroxy - 5:6 - benzo - 2-alpha-pyrone-3-N-heptyl-n-carboxamide completely inhibits a Staphylococcus aureus strain in a concentration of one gamma/cc. in peptone broth, as also does 4:5:7-trihydroxycoumarin-3-N-heptyl-n-carboxamide. Also, 6-chloro-4-hydroxycoumarin-3-N-heptyl-n-carboxamide has the same inhibiting effect even in a concentration of 0.5 gamma/cc. By way of comparison, the antibiotic known as Novobiocin inhibits the same microorganism only in a concentration of one gamma/cc.

The above compounds are less active on Gram-negative bacteria. On the other hand, other derivatives such as 4:5:7-trihydroxycoumarin-3-N - phenylcarboxamide, 4 - hydroxy - 5:6 - benzo- 2 - alpha - pyrone - 3 - (N - p-hydroxyphenyl-carboxamide, 4 - hydroxy - 6 - methyl-2-alpha - pyrone - 3 - (N-p-hydroxyphenyl)-carboxamide, 4 - hydroxy - 5:6 - benzo - 2 - alpha - pyrone - 3-(N-3'-pyridine)-carboxamide) are inhibitors of Gram-negative bacteria, for example of Escherichia coli in a concentration of 20 gammas/cc. in synthetic medium.

Among the compounds of the invention which have the most marked anti-fungic properties, there may be mentioned 4 - hydroxy - 5:6 - benzo - 2 - alpha - pyrone - 3-N - (2' - pyridine) - carboxamide, 4-hydroxy-6-methyl-2-alpha - pyrone - 3 - (N -p-hydroxyphenyl)-carboxamide, 4 - hydroxy - 5:6 - benzo - 2 - alpha - pyrone - 3 - (N-p-hydroxyphenyl)-carboxamide and 6-n-propyl-4-hydroxy-2-alpha-pyrone-3-(N-3'-pyridine) - carboxamide, which act, for example, on Saccharomyces cerevisiae in a concentration of 2 gammas/cc.

The manners in which a number of the compounds of the invention are prepared by the methods previously described are hereinafter explained by way of non-limiting example.

EXAMPLE 1

*Preparation of 4-Hydroxy-5:6-Benzo-2-Alpha-Pyrone-3-N-Heptyl-n-Carboxamide (Crude Formula $C_{17}H_{21}O_4N$) by Condensation of 3-Ethylcoumarin-4-Hydroxycarbamate With n-Heptylamine*

23.4 g. (0.1 mol.) of 3-ethylcoumarin-4-hydroxycarbonate are heated for 1 hour at 160° C. on the metal bath with 46 g. (0.4 mol.) of n-heptylamine. The mixture is allowed to cool and water and an excess of hydrochloric acid are then added. A solid mass is formed, which is separated and recrystallized from alcohol. Melting point: 70° C. Yield: 90%.

Under the same conditions, there are obtained:

With n-hexylamine, 4 - hydroxy - 5:6 - benzo - 2 - alpha-pyrone-3-N-hexyl-n-carboxamide, of crude formula: $C_{16}H_{19}O_4N$. M.P.=75° C.

With n-octylamine, 4 - hydroxy - 5:6 - benzo - 2 - alpha-pyrone-3-N-octyl-n-carboxamide, of crude formula: $C_{18}H_{23}O_4N$. M.P.=74.5° C.

With n-decylamine, 4 - hydroxy - 5:6 - benzo - 2 - alpha-pyrone-3-N-decyl-n-carboxamide, of crude formula: $C_{20}H_{27}O_4N$. M.P.=76° C.

With n-dodecylamine, 4 - hydroxy - 5:6 - benzo-2-alpha-pyrone-3-N-dodecyl-n-carboxamide, of crude formula: $C_{22}H_{31}O_4N$. M.P.=79–80° C.

With benzylamine, 4 - hydroxy - 5:6 - benzo - 2 - alpha-pyrone - 3 - N - benzylcarboxamide, of crude formula: $C_{17}H_{13}O_4N$. M.P.=161.2° C.

With phenylethylamine, 4-hydroxy-5:6-benzo - 2 - alpha-pyrone-3-N-phenyl-ethyl carboxamide, of crude formula: $C_{18}H_{15}O_4N$. M.P.=115° C.

When it is desired to prepare compounds having a relatively short side chain attached to the nitrogen atom from the corresponding aliphatic or olefinic amines, the procedure must be carried out in a sealed tube by reason of the volatility of the latter substances. The amines can then be used either in the pure state or in aqueous solution (notably ammonia, monoethylamine, etc.), but always employing an excess of the base in relation to the theoretical quantity.

There are thus obtained:

With ammonia, 4-hydroxy-5:6-benzo-2-alpha-pyrone-3-carboxamide, of crude formula $C_{10}H_7O_4N$. M.P.=218° C.

With monoethylamine, 4 - hydroxy - 5:6 - benzo-2-alpha-pyrone - 3 - N - ethyl carboxamide, of crude formula: $C_{12}H_{11}O_4N$. M.P.=125° C.

With n-propylamine, 4 - hydroxy - 5:6 - benzo - 2 - alpha-pyrone-3-N-propyl-n-carboxamide, of crude formula: $C_{13}H_{13}O_4N$. M.P.=109–110° C.

With allylamine, 4-hydroxy-5:6-benzo-2-alpha-pyrone-3-N-allylcarboxamide, of crude formula: $C_{13}H_{11}O_4N$. M.P.=99–100° C.

With the secondary amines, it is also convenient to carry out the procedure in a sealed tube and in the presence of an excess of amine. There is hereinafter described in greater detail the method of preparing the derivative corresponding to piperidine.

EXAMPLE 2

*Preparation of 4-Hydroxy-5:6-Benzo-2-Alpha-Pyrone-3-N-Carbonyl-Piperidine by Condensation of 3-Ethylcoumarin-4-Hydroxycarbonate With Piperidine*

3-ethylcoumarin-4-hydroxycarbonate is heated for 30 minutes in a sealed tube at 160° C. with an excess of piperidine. When the sealed tube is opened, a solid mass is found, which is washed with ether and which consists of the amine salt of the desired amide. The instantaneous melting point of this salt (with decomposition) is 188–190° C. It is dissolved in a little alcohol and then acidified with hydrochloric acid. There is formed 4-hydroxy - 5:6 - benzo-2-alpha-pyrone-3-N-carbonyl piperidine, of the crude formula: $C_{15}H_{15}O_4N$. M.P.=155° C.

There is similarly obtained with morpholine 4-hydroxy-5:6-benzo-2-alpha-pyrone-3-N-carbonyl morpholine of crude formula: $C_{14}H_{13}O_5N$. M.P.=154° C.

For the preparation of the compounds corresponding to the aminopyridines, the procedure may be carried out under atmospheric pressure, as with long-chain aliphatic amines. Thus with 2-aminopyridine there is obtained 4-hydroxy - 5:6 - benzo - 2 - alpha - pyrone - 3 - N - (2'-pyridine)-carboxamide of crude formula: $C_{15}H_{10}O_4N_2$. M.P.=230° C.

With 3-amino pyridine, there is obtained 4-hydroxy-5:6 - benzo - 2 - alpha - pyrone - 3 - N - (3' - pyridine)-carboxamide, of crude formula: $C_{15}H_{10}O_4N_2$. M.P.: 250° C.

In the preparation of the compounds corresponding to the substituted aromatic amines, it is preferable to carry out the reaction in the presence of a solvent such as pyridine or ethylene glycol. This is true more especially of the preparation of 4-hydroxy-5:6-benzo-2-alpha-pyrone-3-N-(p-hydroxyphenyl) carboxamide described in the following.

EXAMPLE 3

*Preparation of 4-Hydroxy-5:6-Benzo-2-Alpha-Pyrone-3-N - (p - Hydroxyphenyl)-Carboxamide From 3-Ethyl-Coumarin-4-Hydroxycarbonate and p-Aminophenol*

23.4 g. (0.1 mol.) of 3-ethylcoumarin-4-hydroxycarbonate and 22 g. (0.2 mol.) of p-aminophenol are dissolved in 100 cc. of ethylene glycol, and the temperature is raised for 30 minutes to 160–180° C. The mixture is allowed to cool, and a crystalline mass is formed, which consists of 4-hydroxy-5:6-benzo-2-alpha-pyrone-3-N-(p-hydroxyphenyl)-carboxamide, having the crude formula: $C_{16}H_{11}O_5N$. M.P.=232° C., after recrystallization from alcohol or acetic acid.

Similarly, with o-aminophenol, the corresponding amide, M.P. 240° C., is obtained, and with m-aminophenol the corresponding amide, M.P. 257° C.

From p-chloroaniline there is obtained 4-hydroxy-5:6-benzo-2-alpha-pyrone-3-N-(p-chlorophenyl)-carboxamide of crude formula: $C_{16}H_{10}O_4NCl$, M.P. 219–220° C.

As already mentioned in the foregoing, the compounds of the invention corresponding to 4-hydroxy-2-alpha-pyrones unsubstituted in the 3-position may also be obtained from isocyanates or azides or from isothiocyanates. There are given in the following a number of examples of the preparation by the latter methods.

EXAMPLE 4

*Preparation of 4-Hydroxy-5:6-Benzo-2-Alpha-Pyrone-3-N-Heptyl-n-Carboxamide From 4 - Hydroxycoumarin and n-Heptyl Isocyanate*

The necessary n-heptyl isocyanate can be obtained by treating n-heptyl amine hydrochloride with an excess of a solution of phosgene in toluene at boiling point for 3 hours in toluene. After evaporation of the solvent, n-heptyl isocyanate distills at 80° C. under 20 mm.

4-hydroxycoumarin can be obtained in turn by one of the following methods: Anschütz: Ber. 36, 465 (1903); Boyd, Robertson and Whalley: J. Chem. Soc. 1948, 174.

16.2 g. (0.1 mol.) of 4-hydroxycoumarin are heated for 2 hours at 180° C. with 14.1 g. (0.1 mol.) of n-heptyl isocyanate. On cooling, the orange-coloured solution crystallises. A little alcohol is added and the mixture is agitated in the cold, whereafter the crystals are separated off. After recrystallisation from hot alcohol, the crystals have a melting point of 70–71° C. Yield: 85%.

It will be noted that the melting point obtained is the same as that of the compound prepared by the method of Example 1. In addition, the mixed melting point is not lowered, which confirms the identity of the two products.

Similarly, 4-hydroxy-6-chlorocoumarin-3-N-heptyl-n- carboxamide of crude formula: $C_{17}H_{20}O_4NCl$, M.P. 110° C., is prepared by condensation of 4-hydroxy-6-chlorocoumarin with n-heptylisocyanate.

There are prepared under the same conditions:

4:7-dihydroxycoumarin-3-N-heptyl-n-carboxamide, $C_{17}H_{21}O_5N$. M.P.: 155° C.

4:7-dihydroxy-8-methylcoumarin-3-N-heptyl-n-carboxamide of crude formula: $C_{18}H_{23}O_5N$. M.P. 173–174° C.

4:5:7-trihydroxycoumarin-3-N-heptyl-n-carboxamide of crude formula $C_{17}H_{21}O_6N$. M.P.=175° C.

6-phenyl-4-hydroxy-2-alpha-pyrone-3-N-heptyl-n-carboxamide of crude formula $C_{19}H_{23}O_4N$. M.P.=109–110° C.

6-n-propyl-4-hydroxy-2-alpha-pyrone-3-N-heptyl-n-carboxamide of crude formula $C_{16}H_{25}O_4N$. M.P.=50–52° C.

6-methyl-4-hydroxy-2-alpha-pyrone-3-N-heptyl-n-carboxamide of crude formula $C_{14}H_{21}O_4N$. M.P.=90° C.

By condensing with n-heptyl isocyanate, respectively,

4:7-dihydroxycoumarin,
4:7-dihydroxy-8-methylcoumarin,
4:5:7-trihydroxycoumarin,
6-phenyl-4-hydroxy-2-alpha-pyrone,
6-n-propyl-4-hydroxy-2-alpha-pyrone and 6-methyl-4-hydroxy-2-alpha-pyrone.

Similarly, by heating phenylisocyanate with 4:5:7-trihydroxycoumarin for 1 hour at 180° C., there is obtained 4:5:7-trihydroxycoumarin-3-N-phenyl-n-carboxamide of crude formula $C_{16}H_{11}O_6N$. M.P.=298–300° C.

In the method of preparation hereinbefore described, the isocyanate employed as starting material is replaced by the corresponding azide. It is known that azides are converted into isocyanates by simple heating above their melting point.

EXAMPLE 5

*Preparation of 4-Hydroxy-5:6-Benzo-2-Alpha-Pyrone-3-N-(3'-Pyridine)-Carboxamide From 4-Hydroxy-Coumarin and the 3-Pyridine-Carboxylic Acid Azide*

The preparation of this compound (M.P.: 250° C.) by another method has already been described in Example 2.

The 3-pyridine-carboxylic acid azide necessary for this reaction can be prepared by the method of Curtius (Ber. 31, 2494, 1898).

16.2 g. (0.1 mol.) of 4-hydroxycoumarin are heated with 14.8 g. (0.1 mol.) of 3-pyridine-carboxylic acid azide for 30 minutes at 180° C. The mass solidifies on cooling. Alcohol is added, the mass is scraped, brought to boiling point and separated off. After recrystallisation from alcohol, the crystals have a melting point of 250° C. Yield in the neighbourhood of 75%.

There are obtained with the aid of the same azide:

From 4-hydroxy-6-methyl-2-alpha-pyrone, one obtains 4-hydroxy-6-methyl-2-alpha-pyrone-3-N-(3'-pyridine)-carboxamide of the crude formula:

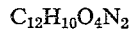

$C_{12}H_{10}O_4N_2$

M.P.=190–191° C.

From 4-hydroxy-6-n-propyl-2-alpha-pyrone, one obtains 4-hydroxy-6-n-propyl-2-alpha-pyrone-3-N-(3'-pyridine)-carboxamide of the crude formula: $C_{14}H_{14}O_4N_2$. M.P.=149–150° C.

From 4-hydroxy-6-phenyl-2-alpha-pyrone, one obtains 4-hydroxy-6-phenyl-2-alpha-pyrone-3-N-(3'-pyridine)-carboxamide of the crude formula: $C_{17}H_{12}O_4N_2$. M.P.=208° C.

Similarly, by heating 2-pyridine-carboxylic acid azide with 4-hydroxycoumarin, there is obtained 4-hydroxy-5:6-benzo-2-alpha-pyrone-3-N-(2'-pyridine)-carboxamide of the crude formula: $C_{15}H_{10}O_4N_2$. M.P.=230° C.

By heating 4-acetoxy-benzoic acid azide with 4-hydroxy-coumarin, there is obtained 4-hydroxy-5:6-benzo-2-alpha-pyrone-3-N-(p-acetoxyphenyl)-carboxamide, which is deacetylated by dissolving it in sodium hydroxide and acidifying it, whereby there is obtained 4-hydroxy-5:6-benzo-2-alpha-pyrone-3-N-(p-hydroxyphenyl)-carboxamide of the crude formula: $C_{16}H_{11}O_5N$. M.P.=232° C. This substance is identical in all respects to that prepared by the method described in Example 3.

By heating the same azide with 4-hydroxy-6-chlorocoumarin, there is obtained after recrystallisation from alcohol 4-hydroxy-6-chlorocoumarin-3-N-(p-acetoxyphenyl)-carboxamide, M.P.: 209° C. This compound, when dissolved in sodium hydroxide and then acidified, gives 4-hydroxy-6-chlorocouramin-3-N-(p-hydroxyphenyl)-carboxamide of the crude formula: $C_{16}H_{10}O_5NCl$. M.P.=283° C. There are similarly obtained:

With 4:7-dihydroxycoumarin, 4:7-dihydroxycoumarin-3-N-(p-hydroxyphenyl)-carboxamide of the crude formula: $C_{16}H_{11}O_6N$. M.P.=308° C.

With 4:5:7-trihydroxycoumarin, 4:5:7-trihydroxycoumarin-3-N-(p-hydroxyphenyl)-carboxamide of the crude formula: $C_{16}H_{11}O_7N$. M.P.=292° C.

With 6-methyl-4-hydroxy-2-alpha-pyrone, 4-hydroxy-6-methyl-2-alpha-pyrone-3-N-(p-hydroxyphenyl)-carboxamide of the crude formula: $C_{13}H_{11}O_5N$. (M.P.=244° C.), by way of the monoacetyl derivative (M.P.=173° C.).

With 6-n-propyl-4-hydroxy-2-alpha-pyrone, 6-n-propyl-4-hydroxy-2-alpha-pyrone-3-N-(p-hydroxyphenyl)-carboxamide of the crude formula: $C_{15}H_{15}O_5N$ (M.P.=184° C.), by way of its monoacetyl derivative (M.P.=152° C.).

There will now be given in the following an example of a process for the preparation of the compounds of the invention corresponding to 4-hydroxy-2-alpha-pyrones unsubstituted in 3-position with the aid of isothiocyanates.

EXAMPLE 6

*Preparation of 4-Hydroxy-6-Methyl-2-Alpha-Pyrone-3-N-Phenylcarboxamide From 4-Hydroxy-6-Methyl-2-Alpha-Pyrone and Phenylisothiocyanate*

12.6 g. (0.1 mol.) of 4-hydroxy-6-methyl-2-alpha-pyrone are heated in intimate admixture with 13.5 g. (0.1 mol.) of phenylisothiocyanate for 15 minutes at 160° C. After cooling, petroleum ether is added, whereafter the crystals are separated off. On recrystallisation from alcohol, there are obtained colourless crystals, M.P. 184° C., which are soluble in a sodium bicarbonate solution. This is 4-hydroxy-6-methyl-2-alpha-pyrone-3-N-phenylthiocarboxamide of the crude formula: $C_{13}H_{11}O_3NS$. Yield=65%.

This substance is dissolved at elevated temperature in alcohol. A considerable excess of basic lead acetate is added, and the mixture is boiled under reflux for 5 minutes. A black lead sulphide precipitate appears. This is filtered and the yellow alcoholic solution is then acidified with hydrochloric acid. A colourless precipitate forms, water is added to dissolve the lead salts, and the product is extracted with ether. The ethereal solution is concentrated, and the residual solid is then recrystalised from alcohol. There is obtained 4-hydroxy-6-methyl-2-alpha-pyrone-3-N-phenyl-carboxamide, M.P. 154° C. Yield: 90%.

Similarly, there are obtained from 4-hydroxycoumarin and phenylisothiocyanate, respectively, 4-hydroxycoumarin-3-N-phenylthiocarboxyamide of the crude formula: $C_{16}H_{11}O_3NS$ (M.P=185–186° C.) and 4-hydroxycoumarin-3-N-phenyl carboxamide of the crude formula: $C_{16}H_{11}O_4N$ (M.P.=213° C.).

What I claim is:

1. A 4-hydroxy-2-alpha-pyrone-carboxamide selected from the group consisting of 4:5:7-trihydroxycoumarin-3-N-phenylcarboxamide, 4 - hydroxy-5:6-benzo-2-alpha-pyrone-3-(N-3'-pyridine)-carboxamide.

2. A 4-hydroxy-2-alpha-pyrone-carboxamide selected from the group consisting of 4-hydroxy-5:6-benzo-2-alpha - pyrone - 3 - N - (2' - pyridine) - carboxamide, 4 - hydroxy - 6 - methyl - 2 - alpha - pyrone - 3 - (N - p - hydroxyphenyl) - carboxamide, 4 - hydroxy - 5:6 - benzo - 2 - alpha - pyrone - 3 - (N - p - hydroxyphenyl) - carboxamide, and 6-n-propyl-4-hydroxy-2-alpha-pyrone-3-(N-3'-pyridine)-carboxamide.

3. 4,5,7 - trihydroxycoumarin - 3 - N - heptyl - n - carboxamide.

4. 4,5,7-trihydroxy coumarin-3-N-phenyl carboxamide.

References Cited in the file of this patent
UNITED STATES PATENTS

| | | |
|---|---|---|
| 2,127,879 | Martin | Aug. 23, 1938 |
| 2,170,127 | Dalmer et al. | Aug. 22, 1939 |
| 2,364,304 | Martin et al. | Dec. 5, 1944 |
| 2,471,047 | Stahmann et al. | May 24, 1949 |
| 2,721,160 | Newcomer | Oct. 18, 1955 |
| 2,731,381 | Newcomer | Jan. 17, 1956 |

OTHER REFERENCES

Organic Syntheses (Alexeyeff), published by John Wiley and Sons (New York), 1906, page 46.

The Chemistry of Organic Compounds (Conant), published by the Macmillan Co. (New York), 1939, page 255.

Lauger et al.: Helvetica Chimica Acta, volume 27, page 892 (1944).

Lowy et al.: An Introduction to Organic Chemistry, published by John Wiley and Sons, Inc. (New York), page 213 (1945).

Buu-Hoi et al.: Bulletin Societe Chemique de France, volume 14, pages 128–136 (1947).

Clinton et al.: Journal American Chem. Soc., volume 71, pages 3602–6 (1949).

Goodwin et al.: "Arch. Biochem.," volume 27, pages 152–73, page 156 relied on (1950).

An Outline of Organic Nitrogen Compounds (Degering), published by University Lithoprinters (Ypsilanti, Mich.), 1950, page 492.

Synthetic Methods of Organic Chemistry (Theilheimer), published by Interscience Publishers Inc. (New York), 1951, page 330.

Ozawa: Chemical Abstracts, volume 46, page 6266 (1952).

Ukita et al.: Chemical Abstracts, volume 49, page 8269 (1955).

Buu-Hoi et al.: Bulletin Societe Chimique de France, volume 24, pages 561–563 (1957).

Toda et al.: Chemical Abstracts, volume 52, No. 22, page 20388, (November 25, 1958).